Patented Feb. 16, 1954

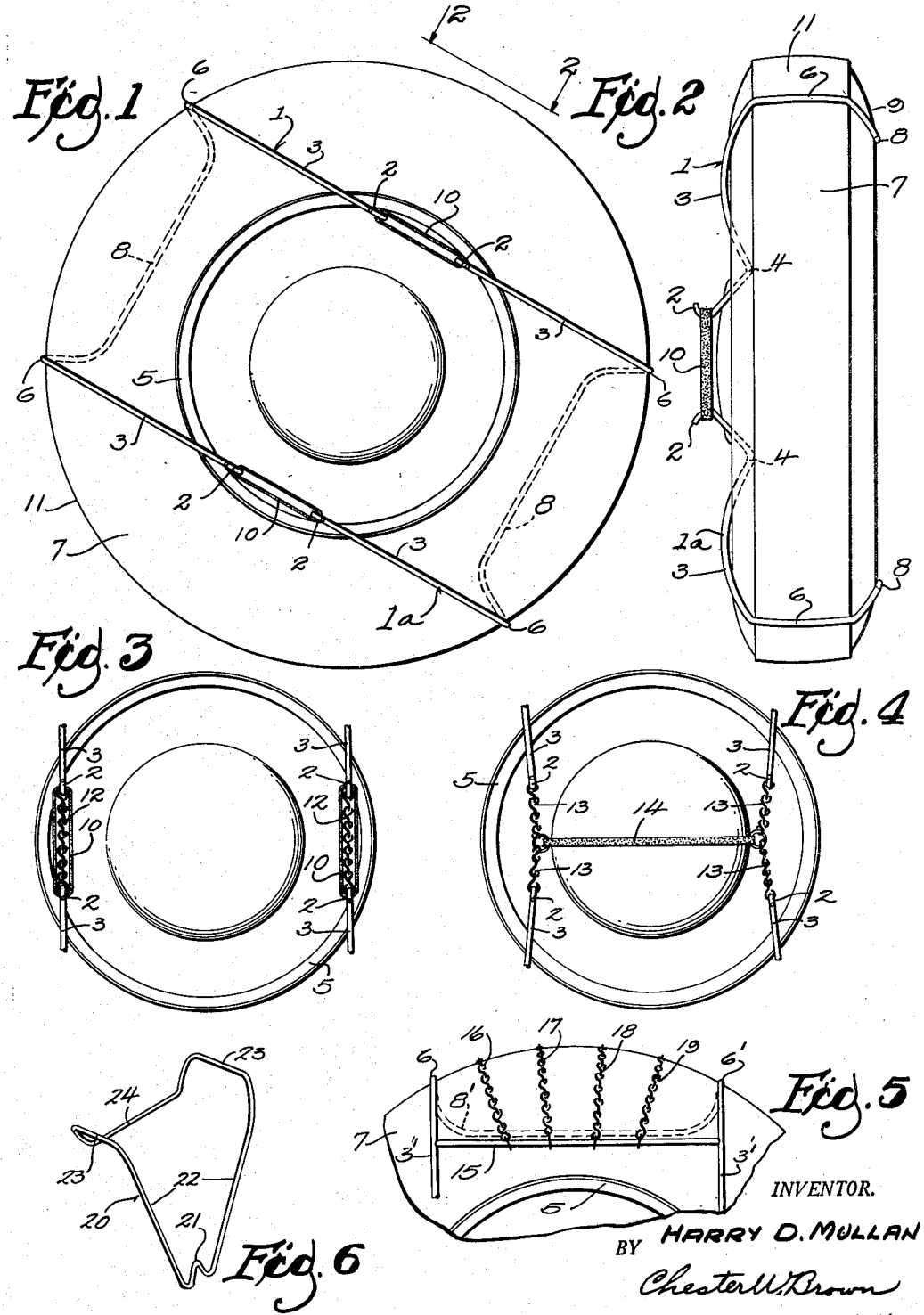

2,669,274

UNITED STATES PATENT OFFICE 2,669,274

GROUND GRIPPING ATTACHMENT

Harry D. Mullan, Wauwatosa, Wis.

Application July 29, 1950, Serial No. 176,605

12 Claims. (Cl. 152—223)

The invention herein disclosed relates to improvements in ground gripping attachments for power driven motor vehicle wheels.

The use of tire chains for increasing the traction on automobile wheels has been in practice for many years. With present day designs of automobile, it is anything but an easy task to attach or detach chains. In fact there are circumstances when it is impossible for the owner to attach the chains. Most all of the automobile drivers prefer to drive to a service station and pay to have tire chains mounted.

Usually traction attachments for wheels are required for only a few feet of bad roadway but are left on the wheels for many miles of travel. As a result the attachments are severely damaged by contact with the roadway.

It is the primary object of this invention to provide a road gripping attachment which may be easily mounted on automobile wheels and which may be as easily demounted by the operator without jacking the car up or crawling beneath it.

Another object is to provide a road gripping attachment which is simple and economical to manufacture and which albeit is as efficient as, or more efficient than present widely used road gripping wheel attachments.

In the drawings:

Fig. 1 is a side elevation of an automobile wheel with my invention mounted thereon.

Fig. 2 is a view as seen from above relative to Fig. 1 and taken at right angle relation to the attachments.

Fig. 3 shows only the wheel rim and a modified form of connection between parts of the ground gripping device.

Fig. 4 shows a further modified connection.

Fig. 5 shows a fragmentary portion of a tire and a modified form of gripping device embodying my invention.

Fig. 6 shows another modified form of gripping device.

As will be evident from the drawings, the ground gripping attachment comprises two identical pieces connected by connecting elements on a cord of the wheel circumference.

In Figs. 1 and 2, the identical pieces 1 and 1a each comprise a single piece of wire which is U-shaped as viewed in Fig. 1 and hook-shaped as viewed in Fig. 2. As will be apparent, the wire is bent to provide a hook 2 at the end of each leg 3. Each leg 3 is bent inwardly to provide an elbow or V-like portion 4 which rides on the rim 5 of the wheel. Each leg terminates in a portion 6 which is curved to be substantially complementary to the transverse contour of the tire 7. Portions 6 of each piece 1 are connected by a part or bar 8 which is disposed at the inner side of the wheel and rests against the inner side wall 9 of the tire 7.

The hooks 2 of each ground gripping piece are connected to the hooks 2 of the other by means of rubber bands 10, or other suitable resilient material adapted to hold the pieces 1 and 1a in positive frictional engagement with the tread 11 of the tire 7. It has been found that the most satisfactory manner of connecting the pieces 1 and 1a is as illustrated in Fig. 1. That is; the legs 3 and resilient bands 10 should in effect form parallel cords relative to the circumference of the tire tread 11. It will of course be understood that I do not limit the invention to this specific manner of connecting the elements. However when connected in the manner described the tension of one of the bands 10 will increase if one of the pieces creeps on the tire tread toward the other. This will tend to hold the pieces 1 and 1a in radial alignment.

In the modification illustrated in Fig. 3 it is contemplated that the gripping pieces will be formed as shown in Figs. 1 and 2, but the hooks 2 will be connected by chains 12 as well as rubber or resilient bands 10. In this manner the amount of stretch of the bands will be limited by the chains 12 when either of the gripping pieces moves toward the other circumferentially about the tire 7.

The modified form illustrated in Fig. 4 comprises a pair of chains 13 which connect the hooks 2 of each piece and a resilient band 14 which joins the intermediate sections of the chains and holds them under tension. As in the Fig. 3 modification, the chains 13 limit the relative movement of the pieces about the periphery of the tire and the band 14 tends to keep the pieces in radial alignment on the wheel.

Fig. 5 illustrates a ground gripping piece in which the legs 3' are connected by a bar 15 which is disposed on the side of the tire opposite that upon which the part 8' is disposed. In this modification, the bar 15 and part 8' are connected by four chains 16, 17, 18 and 19 which extend over the tread 11 on the tire and serve as additional ground gripping elements of the invention herein disclosed. From this disclosure it will be obvious that I contemplate any arrangement which will increase the ground gripping engagement if the operator prefers such.

The ground gripping element 20 illustrated in Fig. 6 is formed in a closed wire loop comprising a hook portion 21, divergent leg portions 22 terminating in curved portions 23, and a bar 24 connecting the portions 23. The mode of operation of this modified form is similar to that inherent in the previously disclosed forms, but in this case the single hook portion 21 is connected to a similar hook portion on an identical closed loop (not shown) by means of a resilient member and chain (not shown) if preferred.

The wire utilized in the manufacture of the ground gripping elements herein disclosed is preferably of such metal as may be easily formed and thereafter heat treated to give it sufficient hardness to hold its shape when placed under stress and to resist wear.

It is believed to be apparent from the foregoing, that a ground gripping attachment embodying my invention may be easily attached or detached by an automobile operator. He will stand at the side of the wheel, first hook one of the pieces over the tire then hook the other over the tire in diametric relation to the first piece, and then place the rubber bands on the hooks 2 as indicated in Figs. 1 and 2. Where chains are provided in addition to the bands, he will preferably connect them with the hooks before placing the bands thereon as suggested in Fig. 3. If the modified form of Fig. 4 is used the chains 13 will be mounted on the hooks 2 before connecting the band 14 to the chains.

I claim as my invention:

1. In combination with a vehicle wheel including a pneumatic tire, of a ground gripping attachment comprising a pair of members mounted on said tire in diametrically opposed relation, each member including a pair of legs extending in spaced-parallel relation inwardly of the tread of said tire, a hook on each of said legs, a curved portion on each leg embracing the tread and side walls of said tire and a bar portion connecting said curved portion, a pair of chains each connecting a hook on one member with a corresponding hook on the other member, and a resilient connection between the intermediate portion of said chains holding said chains taut between said members.

2. A ground gripping attachment for a vehicle wheel having a rim and a resilient tire mounted thereon, said attachment comprising a pair of spaced legs conformed in contour to substantially the transverse contour of said tire, each leg terminating in a hook at one end and integral with a bar common to both at the other end, said legs each having a V-like portion adjacent said hook disposed inwardly for engagement with said rim.

3. A ground gripping attachment for a vehicle wheel including a rim and a pneumatic tire, said attachment comprising a pair of spaced substantially parallel legs conformed in contour to substantially the transverse contour of said tire, each leg having a hook at one end and integral with a bar common to both at the other end, and each having a V-like portion adjacent said hook disposed inwardly for engagement with said rim.

4. A ground gripping attachment for a vehicle wheel substantially as set forth in claim 3, in combination with a second bar connecting said legs and a plurality of chains connected to said second bar and the first mentioned bar, said bars being disposed for positioning on relatively opposite sides of said tire and said chains adapted to assume the transverse contour of said tire.

5. In combination with a vehicle wheel including a rim and a pneumatic tire, of a ground gripping attachment comprising a pair of members mounted on said tire in diametrically opposed relation, each member including a pair of spaced parallel legs conformed in contour to substantially the transverse contour of said tire, each leg having a hook at one end and integral with a bar common to both at the other end, and each leg having a portion bowed inwardly into contact with said rim, a pair of chains each connecting a hook on one member with a corresponding hook on the other member, said connected hooks and chain disposed on a cord of said wheel substantially common to them, and a resilient connection between intermediate portions of said chains holding said chains taut between said members, said hooks disposed outwardly of said wheel whereby tension of said resilient connection maintains said bowed portion in contact with said rim.

6. In combination with a vehicle wheel including a rim and a pneumatic tire, of a ground gripping attachment comprising a pair of members mounted on said tire in diametrically opposed relation, each member including a pair of spaced parallel legs conformed in contour to substantially the transverse contour of said tire, each leg having a hook at one end and integral with a bar common to both at the other end, and each leg having a portion bowed inwardly into contact with said rim, a pair of flexible substantially non-extensible elements each connecting a hook on one member with a corresponding hook on the other member, said connected hooks and element disposed on a cord of said wheel substantially common to them, and a resilient connection between intermediate portions of said elements holding said elements taut between said members, said hooks disposed outwardly of said wheel whereby said resilient connection maintains said bowed portions in contact with said rim.

7. In combination with a vehicle wheel including a rim and a pneumatic tire, of a ground gripping attachment comprising a plurality of members mounted on said tire in spaced circumferential relationship thereon, each member including a pair of spaced legs conformed in contour to embrace the sides and tread of said tire, each leg having a hook at one end and integral with a bar common to both at the other end, and each leg having a portion bowed inwardly into contact with said rim, a plurality of flexible substantially non-extensible elements each connecting a hook on one member with a corresponding hook on another member, the connected hooks being relatively less remote than they are relative to the remaining connected hooks on the other members, and resilient means between said elements holding them taut between said hooks.

8. In combination with a vehicle wheel including a rim and a pneumatic tire, of a ground gripping assembly mounted on said tire and comprising a plurality of members on the periphery of the tire in spaced circumferential relationship, each member including a pair of spaced legs conformed in contour to embrace the sides and tread of said tire, each leg having a hook at one end and integral with a bar common to both at the other end, and each leg having a portion bowed inwardly into contact with said rim, and means inter-connecting a hook on one of said members with a corresponding hook on another of said members, said means biasing said connected hooks towards each other and including an element between said connected hooks permitting free movement of said connected hooks under the influence of said biasing means and positively fixing the limit of relative movement of said connected hooks away from each other, said means permitting a limited creeping of each member about the periphery of the tire relative to the other members.

9. In combination with a vehicle wheel including a pneumatic tire, of a ground gripping attachment comprising a pair of members mounted on said tire in diametrically opposed relation, each member including a pair of spaced parallel legs conformed in contour to substantially the transverse contour of said tire and embracing the side walls and tread of said tire, each leg having at one end a connector portion and integral with a bar common to both at the other end, the portion of each of said legs embracing one wall of said tire adjacent said one end being bowed inwardly relative to a side of said wheel and said one end disposed outwardly at an angle relative to said side of said wheel, and a pair of flexible substantially nonextensible elements each engaged with a connector portion on one member and with a corresponding connector portion on the other member, the corresponding legs on said members, connector portions on said corresponding legs and elements engaged therewith being disposed on a cord of said wheel substantially common to them.

10. In combination with a vehicle wheel including a pneumatic tire, of a ground gripping attachment comprising a pair of members mounted on said tire in diametrically opposed relation, each member including a pair of spaced parallel legs conformed in contour to substantially the transverse contour of said tire and embracing the side walls and tread of said tire, each leg having at one end a connector portion and integral with a bar common to both at the other end, the portion of each of said legs embracing one wall of said tire adjacent said one end being bowed inwardly relative to a side of said wheel and said one end disposed outwardly at an angle relative to said side of said wheel, a pair of flexible substantially nonextensible elements each engaged with a connector portion on one member and with a corresponding connector portion on the other member, the corresponding legs on said members, connector portions on said corresponding legs and elements engaged therewith being disposed on a cord of said wheel substantially common to them, and a resilient connection between intermediate portions of said elements holding said elements taut between said members.

11. In combination with a vehicle wheel including a pneumatic tire, of a ground gripping attachment comprising a pair of members mounted on said tire in diametrically opposed relation, each member including a pair of spaced parallel legs conformed in contour to substantially the transverse contour of said tire and embracing the side walls and tread of said tire, each leg having at one end a connector portion and integral with a bar common to both at the other end, the portion of each of said legs embracing one wall of said tire adjacent said one end being bowed inwardly relative to a side of said wheel and said one end disposed outwardly at an angle relative to said side of said wheel, a pair of flexible substantially nonextensible elements each engaged with a connector portion on one member and with a corresponding connector portion on the other member, the corresponding legs on said members, connector portions on said corresponding legs and elements engaged therewith being disposed on a cord of said wheel substantially common to them, and a resilient connection between corresponding connector portions of said members urging said member toward each other and into frictional engagement with the tread of said tire.

12. A ground gripping attachment for a vehicle wheel including a pneumatic tire, said attachment comprising a resiliently flexible wire embodying a pair of spaced substantially parallel legs conformed in contour to substantially the transverse contour of said tire, each leg terminating in a connector portion at one end and integral with a bar portion common to both at the other end, the portion of each of said legs adjacent said one end being bowed inwardly toward a side of said wheel and said one end disposed outwardly at an angle relative to said side of said wheel.

HARRY D. MULLAN.

References Cited in the file of this patent

UNITED STATES PATENTS

| Number | Name | Date |
|---|---|---|
| 1,139,304 | Lyon | May 11, 1915 |
| 1,249,969 | Kester | Dec. 11, 1917 |
| 1,627,806 | Ross | May 10, 1927 |
| 2,290,398 | Wellington | July 21, 1942 |
| 2,315,838 | Bryon | Apr. 6, 1943 |
| 2,528,165 | Nickerson | Oct. 31, 1950 |